July 26, 1932. W. M. GUERTLER 1,868,499
PROCESS OF RECOVERING ALUMINA FROM SILICIOUS MATERIALS CONTAINING IT
Filed Sept. 6, 1930
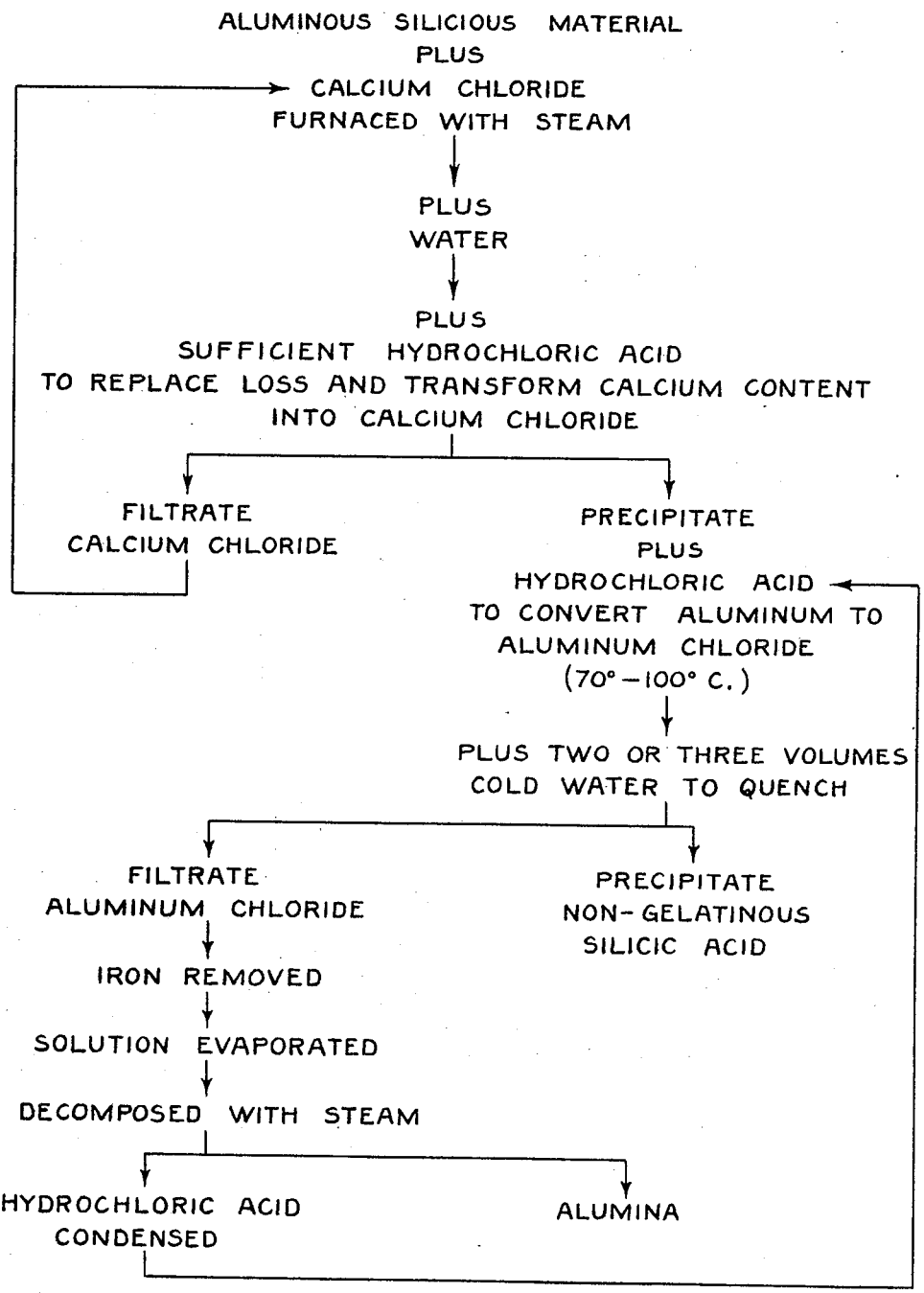
INVENTOR
Wm M Guertler
BY
Evans & McCoy
ATTORNEYS Patented July 26, 1932

1,868,499

UNITED STATES PATENT OFFICE

WILLIAM M. GUERTLER, OF BERLIN, GERMANY, ASSIGNOR TO THE ELECTRIC SMELT-ING & ALUMINUM COMPANY, OF CLEVELAND, OHIO, A CORPORATION OF OHIO

PROCESS OF RECOVERING ALUMINA FROM SILICIOUS MATERIALS CONTAINING IT

Application filed September 6, 1930, Serial No. 480,270, and in Germany June 7, 1929.

This invention relates to the recovery of alumina from silicious materials containing alumina such as clay, leucite, silicious bauxite and the like.

An object of my invention is to secure alumina from such silicious materials in a simple and efficient manner and by a process in which the various byproducts obtained in the extraction of alumina may be reused in the process or are in themselves valuable commercial products.

A further object of my invention is to recover alumina from clay, for example, by the use of an alkaline earth metal chloride in such manner that the hydrochloric acid formed may be recovered in part as an alkaline earth metal chloride and in part as hydrochloric acid both of which may be reused in the process.

It has been formerly proposed to furnace a mixture of clay and calcium chloride with steam to form hydrochloric acid and a clinker of calcium aluminum silicate which clinker is further treated with a suitable base such as an alkali metal carbonate to produce a soluble alkali metal aluminate and an insoluble calcium silicate. Alumina can then be readily extracted from the alkali metal aluminate solution so formed.

In my process I use the step of furnacing the clay or other silicious material containing alumina, with calcium chloride and water vapor or steam and carry out the reaction in such a way that the reaction is reversible and the calcium and aluminum content may be converted into salts which are capable of separation by selective solution.

My process is particularly advantageous in that the products formed in the various reactions may be reused in the process so that the raw material is consumed and alumina ultimately produced without any substantial waste of the raw materials or reagents used in the process, whereas in the formerly proposed process mentioned above the products other than alumina formed are mainly waste products or are products which are only recoverable to form valuable products with objectionable expense.

According to my process, when a silicious material containing alumina such as clay, for example, is mixed with a suitable chloride of an alkali earth metal such as calcium chloride and heated with steam, a reversible reaction takes place whereby at a high temperature the charge decomposes to form hydrochloric acid, alumina and lime or calcium silicate, and at a lower temperature the reaction is reversible and the calcium chloride and aluminum chloride may be dissolved in separate solutions from the insoluble silica residue.

In carrying out my process it is desirable to proceed in a series of steps as shown in the accompanying flow sheet, which consist essentially in the following:

Step one consists in mixing the silicious material with calcium chloride and furnacing with steam.

Step two consists in treating the furnaced mixture to dissolve and separate calcium chloride.

Step three consists in treating the residue from step two to dissolve and separate aluminum chloride therefrom.

Step four consists in purifying the aluminum chloride solution and decomposing to form alumina.

In carrying out step one of my process the clay should preferably be mixed with calcium chloride in the proportion of two molecules of calcium chloride to one molecule of silica contained in the clay molecule and then heated to a temperature of substantially 650 to 700 degrees C. in the presence of steam. It is also feasible to mix the clay and calcium chloride in the proportion of one molecule of calcium chloride to one molecule of silica of the clay molecule, but in this case it is necessary to heat the mixture to a temperature of substantially 800 to 900 degrees C. in the presence of steam in order to carry out the reaction. In either case the reaction takes place with the formation of hydrochloric acid, alumina and a calcium silicate, substantially in accordance with the following reactions in which clay is the silicious material used:

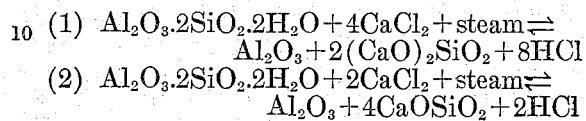

The furnacing reaction can be carried out in a rotary furnace or preferably in a furnace similar to the Wedge furnace used in roasting ores with chlorine. A furnacing of substantially one hour has been found satisfactory.

In the event that a substantial portion of the hydrochloric acid produced in the reacting mass is expelled by the heat, it may be recovered in any suitable way as by absorbing it in water, and be subsequently used in the process.

In carrying out step two of the process the furnaced material resulting from step one is treated with water while it is still hot so that the heat of the solids may be used to bring up the temperature of the added water to approximately the temperature desired. At this time there should be only sufficient molecules of chlorine present in the mixture to combine with the molecules of calcium in order to form calcium chloride without forming other chlorides. If hydrochloric acid has been expelled in the furnacing operation carried out in step one, it may readily be replaced by the condensed and absorbed hydrochloric acid obtained from step one or by other hydrochloric acid to secure such proportion of chlorine molecules to calcium molecules.

If this treatment is carried out at substantially 100 degrees C. the chlorine will react with the calcium in the above proportions to form calcium chloride. It is essential at this step in the process to have the solution as concentrated as possible and it has been found that if water is added to the hot solid so that there will be substantially 100 parts of water present to 160 parts of calcium chloride present, the calcium chloride will be readily dissolved and the solution may be decanted or filtered away from the solids, which solids can be washed if desired.

In case the furnacing carried out in step one of the process produces an uneven roast so that the reaction in step one is not carried to completion with respect to all the material present, there may be calcium chloride, aluminum chloride and lime or silicic acid present with the alumina. However, by properly carrying out the treatment of the roasted material with water and hydrochloric acid according to step two only calcium chloride will dissolve and remain in the solution, because the lime or calcium silicate present in the mixture will precipitate any soluble aluminum salt. In the event that some of the alumina does dissolve in the calcium chloride solution due to the presence of too much acid, it can be readily precipitated by treatment of the solution with more of the furnaced material or with lime or limestone.

It will thus be seen that it is desirable to proportion the amount of chlorine molecules present to the calcium molecules in the ratio of two chlorine molecules to one calcium molecule to effect a formation of calcium chloride and a substantially complete separation thereof from the other materials, so that the calcium may be removed at this point and not carried over to the next step in the process.

In carrying out step three of the process the solids remaining from step two are treated with hydrochloric acid in sufficient amount to form aluminum chloride from all of the aluminum present in the mixture. This operation should be carried out in a controlled manner in order to prevent the formation of gelatinous silicic acid which filters slowly and with great difficulty. The treatment of the mixture with the hydrochloric acid should be carried out at a temperature within the range of 70 degrees to 100 degrees C., and preferably from about 80 to 90 degrees C., and with proper acidity, and then the material should be quenched suddenly by the addition of cold water in amount of two or three times the volume of the mass. By this treatment the silicic acid is formed in a condition readily filterable and aluminum chloride can be readily separated from the insoluble silicic acid. Any titanium present in the mixture remains with the silicic acid in insoluble form. The residue of silicic acid, of course, may be used in any desired way such for example as making glass, etc.

In carrying out step four of the process the solution of aluminum chloride may be treated to remove any iron which may be present in the solution. This can be done by any suitable method one of which may be the separation by electro osmosis using filters of aluminum hydroxide.

After the iron has been removed the aluminum chloride solution may then be evaporated and decomposed with steam at a temperature of substantially 150 degrees C. to form hydrochloric acid and alumina. The hydrochloric acid may be recovered by condensing for reuse in the process or for other purposes.

Another method of obtaining the alumina from the aluminum chloride solution is to mix it with an equivalent amount of sodium aluminate solution to form aluminum hydrate and sodium chloride, and the aluminum hydrate can then be ignited to form alumina, as is well known.

It will be seen that it is possible to use alkali earth metal chlorides such as barium chloride or magnesium chloride but it is preferred to use calcium chloride on account of its availability and low cost. It will also be seen that instead of using calcium chloride, a suitable alkali metal chloride, such as sodium chloride, can be used with lime in forming the mixture for the furnacing operation.

In order to dissolve the aluminum content of the mixture after the calcium content has been removed according to step two of the process, such aluminum content may be dissolved in sulphuric acid instead of hydrochloric acid although the latter is preferred under most conditions.

It will be noted that in carrying out my process for the recovery of alumina from silicious material such as clay that the calcium chloride which is used in step one of the process is recovered in step two of the process and may be used again for treatment of further raw materials.

It will also be seen that if desired the hydrochloric acid may be recovered from the decomposition of aluminum chloride formed in my process and such hydrochloric acid may, of course, be conveniently reused in the process for further extraction of the aluminum and calcium content of the material. Also the hydrochloric acid that is driven off during the furnacing operation, as carried out in step one of the process, may be recovered and returned to the process if desired.

It will thus be seen that the reagents used in the process may largely be recovered and used again so that my process can be carried on in a simple and efficient manner, for due to the possibility of reusing the by-products obtained in carrying out the process it is necessary only to supply further silicious raw material containing alumina and so produce alumina and silicic acid as end products.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The process of recovering alumina from silicious material containing alumina, which consists in treating the material with a chloride of an alkali earth metal in the presence of steam so as to cause a reaction which forms silicates of such alkali earth metal, alumina and hydrochloric acid at high temperatures, cooling the reaction product to a sufficiently low temperature so as to cause a reaction to take place between the chlorine and the alkaline earth metal to form an alkaline earth chloride, separating the alkaline earth metal chloride, and extracting the aluminum content from the residue.

2. In the process of recovering alumina from a silicious material containing alumina, the steps of furnacing a mixture of such silicious material and calcium chloride with steam, cooling the reaction product to a sufficiently low temperature so as to cause a reaction to take place between the chlorine and the calcium in the product thus obtained, separating the calcium chloride and extracting the aluminum content from the residue.

3. In the process of recovering alumina from silicious material containing alumina, according to claim 2, the step of extracting the furnaced material with approximately a sufficient molecular amount of hydrochloric acid to react with the calcium and with only a sufficient amount of water to form a highly concentrated solution of the calcium chloride thus formed, thereby obtaining a substantially complete extraction of the alkali earth metal chloride.

4. The process of recovering alumina from silicious material containing alumina, which consists in treating the material with a chloride of an alkali earth metal in the presence of steam thereby forming silicates of such alkali earth metal, alumina and hydrochloric acid at high temperatures, cooling the reaction product, thereby forming an alkali earth metal chloride, removing the residue and dissolving the aluminum content of the mass with hydrochloric acid, and treating the aluminum chloride solution so as to obtain alumina.

5. The process according to claim 4, in which the aluminum chloride is treated with steam so as to form alumina and hydrochloric acid, and recovering the hydrochloric acid for reuse in the process.

6. The process of recovering the aluminum content of silicious material containing alumina, which consists in mixing such material with a chloride of an alkali earth metal in the proportion of two molecules of such chloride to each molecule of silica in such material, heating the mixture in the presence of steam sufficiently so as to cause a reaction which forms silicates of the alkali earth metal, alumina and hydrochloric acid, cooling the product and adding hydrochloric acid, thereby forming an alkali earth metal chloride, separating the alkali earth metal chloride and adding additional hydrochloric acid to dissolve the aluminum content.

7. The process of recovering the aluminum content of silicious material containing alumina, which consists in mixing such material with calcium chloride in the proportion of two molecules of such chloride to each molecule of silica in such material, heating the mixture in the presence of steam to substantially 650° to 700° C. so as to cause a reaction which forms silicates of the calcium, alumina and hydrochloric acid, cooling the product and adding hydrochloric acid, thereby forming an alkali earth metal chloride, separating the alkali earth metal chloride and adding additional hydrochloric acid to dissolve the aluminum content.

8. The process of recovering the aluminum content of silicious material containing alumina, which consists in mixing such material with calcium chloride in the proportion of one molecule of such chloride to each molecule of silica in such material, heating the mixture in the presence of steam to substantially 800° to 900° C. so as to cause a reaction which forms silicates of the calcium, alumina and hydrochloric acid, cooling the product and adding hydrochloric acid, thereby forming an alkali earth metal chloride, separating the alkali earth metal chloride and adding additional hydrochloric acid to dissolve the aluminum content.

9. The process of recovering alumina from a silicious material containing alumina, which consists in mixing the material with a chloride of an alkali earth metal, heating the mixture to a high temperature in the presence of steam to form silicates of such alkali earth metal, alumina and hydrochloric acid, cooling the material and treating it with water and sufficient hydrochloric acid to extract the chloride of the alkali earth metal, separating the calcium chloride and treating the residue with hydrochloric acid to form a solution of aluminum chloride, and forming alumina therefrom.

10. The process according to claim 9, which consists in recovering the hydrochloric acid evolved from the heating of silicious material, and reintroducing the hydrochloric acid so recovered for selectively dissolving the calcium and aluminum from the furnaced material.

11. The process of recovering alumina from silicious material containing alumina, which consists in furnacing the material with calcium chloride in the presence of steam to cause a reversible reaction which forms calcium silicate, alumina and hydrochloric acid at high temperatures and treating the mixture at lower temperatures to transform the calcium silicate to calcium chloride and separating the calcium chloride from the solution to facilitate the extraction of the aluminum content, and recovering the hydrochloric acid evolved in the furnacing reaction for subsequent use in the process.

12. In the process of extracting the aluminum content of silicious material containing alumina, the steps which comprise furnacing such material with calcium chloride and steam, adding sufficient hydrochloric acid so that the molecular proportion of calcium and chlorine will be substantially equal, extracting the calcium content and subsequently treating the residue with hydrochloric acid at a temperature of about 80° or 90° C. so as to dissolve the aluminum content, and quenching by the addition of two to three parts of cold water so as to cause the silicic acid to be in a form readily filterable.

13. The process of recovering alumina from silicious material containing it, which consists of forming a charge of such material with calcium chloride in the proportion of two molecules of such chloride to one molecule of silica in such material, furnacing the charge in the presence of steam to form calcium silicate, hydrochloric acid and alumina, and then adding water to the hot material and reducing the temperature of the mixture to about 100° C. to transform substantially all of the calcium content to calcium chloride, removing the calcium chloride, adding hydrochloric acid, and suddenly quenching the material by the addition of cold water to prevent the formation of gelatinous silicic acid, whereby aluminum chloride is formed and may be readily separated from the non-gelatinous silicic acid.

14. The process of recovering alumina from aluminous silicious material which consists in forming a charge of such material with calcium chloride in the proportion of two molecules of calcium chloride to one molecule of silica, furnacing the material in the presence of steam to form calcium silicate, hydrochloric acid and alumina, adding water and sufficient hydrochloric acid to replace any hydrochloric acid lost in the furnacing of the charge, separating the solution of calcium chloride, adding hydrochloric acid and maintaining the temperature between 70° and 100° C., and suddenly quenching the material by the addition of several times its volume of cold water, to prevent the formation of gelatinous silicic acid, and extracting the aluminum chloride and hydrochloric acid.

In testimony whereof I affix my signature.

WILLIAM M. GUERTLER.